United States Patent [19]
Robinson

[11] Patent Number: 6,020,878
[45] Date of Patent: Feb. 1, 2000

[54] SELECTIVE CALL RADIO WITH HINGED TOUCHPAD

[75] Inventor: Edward H. Robinson, Fort Worth, Tex.

[73] Assignee: Motorola, Inc., Schaumburg, Ill.

[21] Appl. No.: 09/088,012

[22] Filed: Jun. 1, 1998

[51] Int. Cl.[7] .................................................. G09G 5/08
[52] U.S. Cl. ......................... 345/173; 345/905; 361/681; 340/825.44
[58] Field of Search ...................... 340/825.44; 345/173, 345/905; 361/679, 680, 681, 686

[56] References Cited

U.S. PATENT DOCUMENTS

| | | | |
|---|---|---|---|
| 4,129,747 | 12/1978 | Pepper | 178/19 |
| 4,302,011 | 11/1981 | Pepper | 273/85 |
| 4,916,441 | 4/1990 | Gombrich | 340/712 |
| 5,182,553 | 1/1993 | Kung | 340/825.44 |
| 5,251,102 | 10/1993 | Kimble | 361/683 |
| 5,327,161 | 7/1994 | Logan et al. | 345/157 |
| 5,459,458 | 10/1995 | Richardson et al. | 340/825.52 |
| 5,469,194 | 11/1995 | Clark et al. | 345/173 |
| 5,572,237 | 11/1996 | Crooks et al. | 345/156 |
| 5,684,513 | 11/1997 | Decker | 345/168 |
| 5,729,219 | 3/1998 | Armstrong et al. | 341/20 |

FOREIGN PATENT DOCUMENTS

91/16771  10/1991  WIPO ............................. 340/825.44

Primary Examiner—Richard A. Hjerpe
Assistant Examiner—Kimnhung Nguyen

[57] ABSTRACT

A selective call radio (10), includes a controller, a switch (33), and a selective call radio housing (12), including a display housing member (19) having a display (18) and a touchpad housing member (29) having a touchpad (22). The touchpad housing member is movable from a closed position where the touchpad is contraposed to the display, to an opened position where the touchpad is on a same side of the selective call radio as is the display. The switch is electrically coupled to the touchpad, to the display and to the controller, and is actuated depending upon mechanical position of the touchpad housing member relative to the display housing member. The controller selectively sets the coordinate system of the touchpad and selectively sets a positioning factor for regulating amount of movement on the display caused by movement on the touchpad, based upon actuation of the switch.

21 Claims, 4 Drawing Sheets

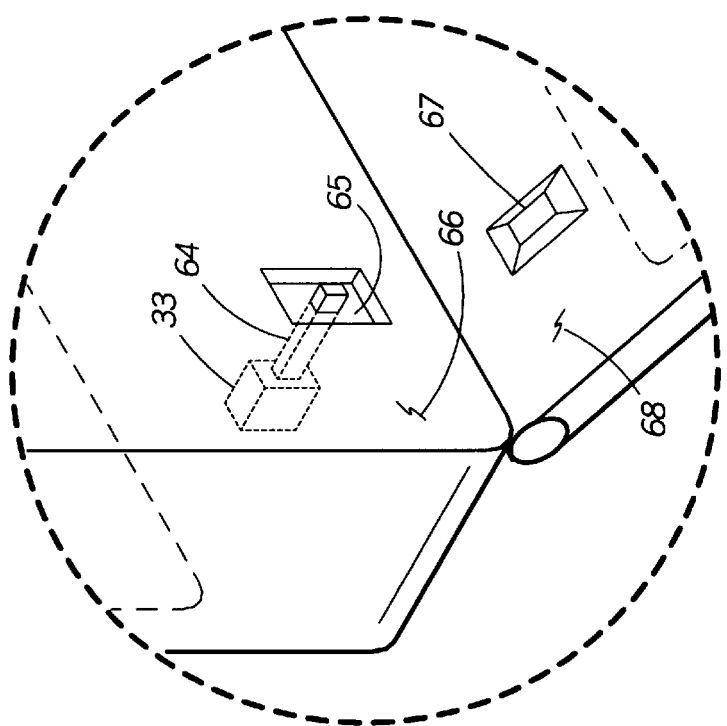
*FIG. 4* (VIEW A)
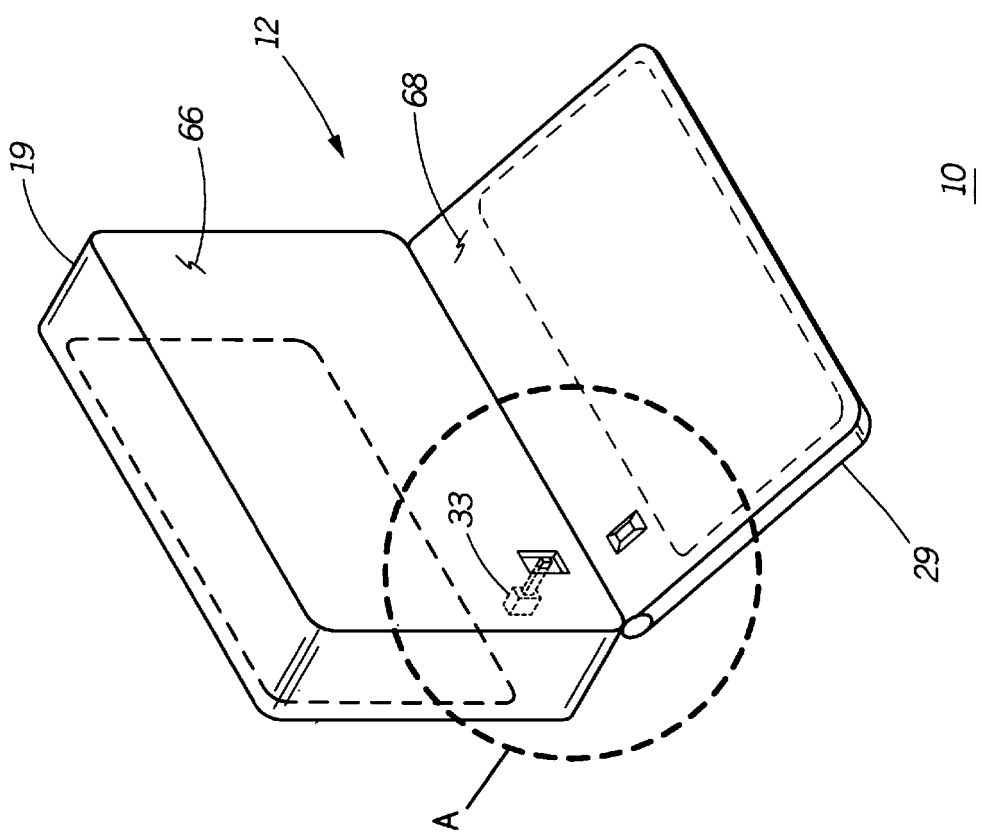
*FIG. 3*

SELECTIVE CALL RADIO WITH HINGED TOUCHPAD

FIELD OF THE INVENTION

This invention relates in general to selective call radios and more specifically to a selective call radio having a touchpad.

BACKGROUND OF THE INVENTION

A touchpad on a portable computer is well known. See, for example, U.S. Pat. No. 5,469,194, entitled *Apparatus and Method for Providing Different Input Device Orientations of a Computer System,* issued Nov. 21, 1995 to Clark, et al. A touchpad on a portable computer is mounted on the same side of the portable computer housing as is mounted a display, such that both the display and the touchpad are visible to the user during operation. Further, a touchpad on a portable computer is coupled to a display such that movement in any given direction on the touchpad corresponds to movement in the same direction on the display, and with relative positioning with regard to movement on the touchpad and movement on the display.

A selective call radio with a contraposed touchpad is known. See U.S. Pat. No. 5,729,219 entitled *Selective Call Radio with Contraposed Touchpad,* issued Mar. 17, 1998 to Armstrong et al. In a selective call radio with a contraposed touchpad, the touchpad and the display are mounted such that both are not visible to the user simultaneously. Typically, during operation, the display is viewed, and the touchpad cannot be seen—merely felt. Further, a touchpad on a selective call radio with a contraposed touchpad is coupled to the display such that movement along one direction on the touchpad corresponds to movement in an opposite direction on the display, and with absolute positioning with regard to movement on the touchpad and movement on the display.

A single touchpad cannot alternately function as a touchpad mounted on the same side as a display and as a contraposed touchpad mounted on the side opposite the display by simply relocating the touchpad because there is also a need to also change the coordinate systems and the positioning factors.

Thus, what is needed is a selective call radio having a display and a hinged touchpad that can function both in the manner of a touchpad for a portable computer and in the manner of a touchpad for a selective call radio with a contraposed touchpad, depending upon the position of the hinged touchpad.

BRIEF DESCRIPTION OF THE DRAWINGS

FIG. 3 is a perspective view of an opposite side of the selective call radio of FIG. 1 showing the touchpad housing member in an intermediate position.

FIG. 4 is an enlarged view of a portion of the selective call radio shown in FIG. 3 showing details of the area indicated.

DESCRIPTION OF THE PREFERRED EMBODIMENT

Figure 1:
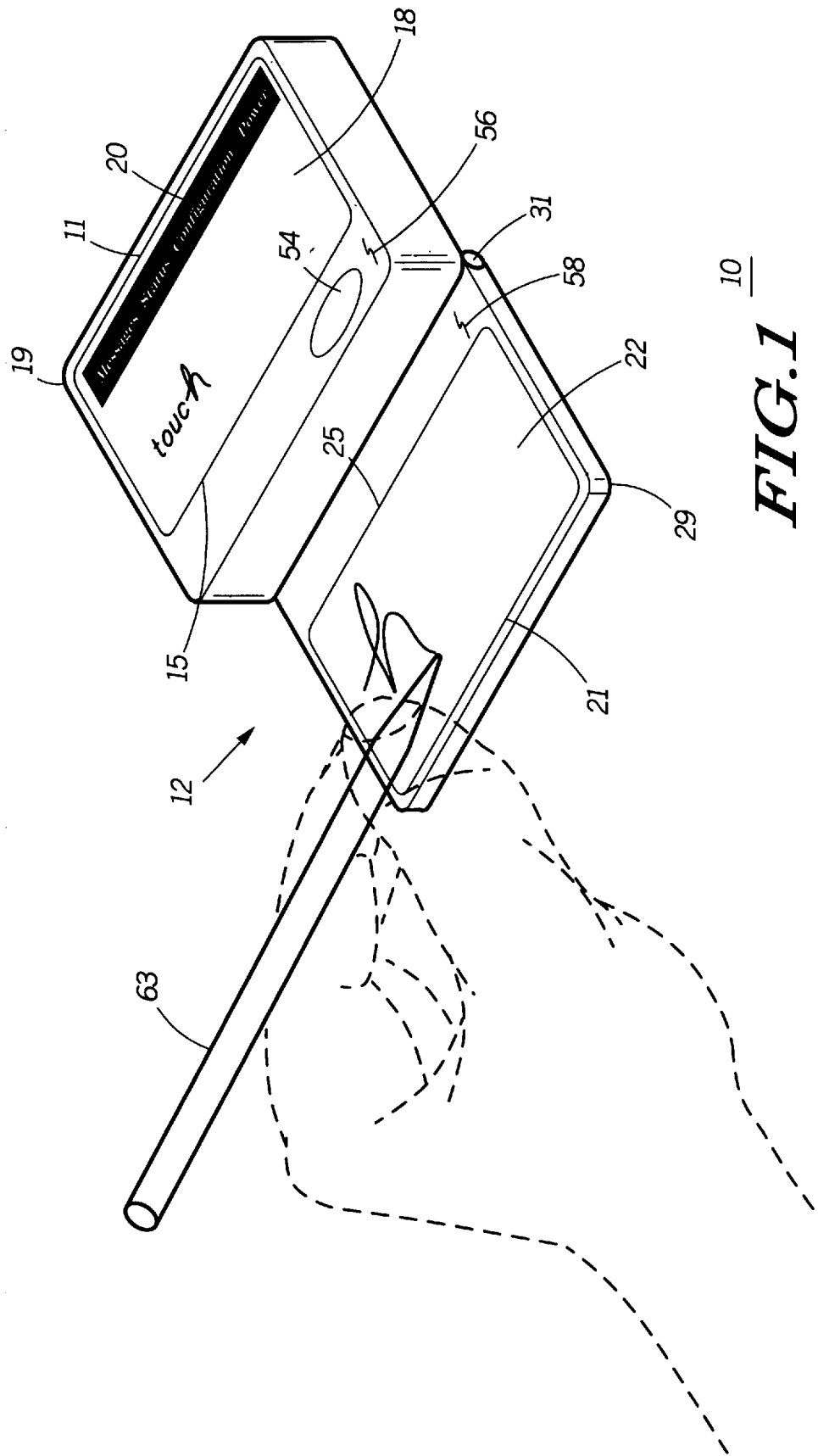
FIG. 1 is a perspective view of a selective call radio showing a touchpad housing member in an opened position, in accordance with the preferred embodiment of the present invention.

FIG. 1 is a perspective view of a selective call radio 10 comprising a selective call radio housing 12. The selective call radio housing 12 has a display housing member 19 and a touchpad housing member 29 and a hinge 31. The touchpad housing member 29 is hingely connected to the display housing member 19; however, the details of the hinge 31 are not within the scope of the invention. Preferably, the display housing member 19 and the touchpad housing member 29 are made of molded, polycarbonate, plastic material.

The selective call radio 10, such as, for example, a portable, battery-powered, one-way pager or a two-way pager, operates to receive a radio frequency signal via an antenna. The selective call radio 10 includes a receiver that couples the received signal to a demodulator which recovers any embedded information using conventional techniques. The recovered information is coupled to a controller that interprets and decodes the recovered information. The controller typically comprises a microprocessor having a signal processor (decoder) implemented in both hardware and software. In a manner that is well known in the art, the recovered information is checked by the decoder, which implements the signal processor that correlates a recovered address with a predetermined address stored in the selective call radio's non-volatile memory, such as read-only memory (ROM). The ROM typically has a plurality of registers for storing a plurality of configuration words that characterize the operation of the selective call radio. The selective call radio selects a message by performing a correlation between a predetermined address associated with the selective call radio and a received address. When the addresses correlate, the controller couples message information to the message memory.

The selective call radio 10 includes a display 18 mounted to a first surface 56 of the display housing member 19, and a touchpad 22 mounted to a first surface 58 of the touchpad housing member 29. In response to the recovered information and to settings associated with user controls, the selective call radio includes a means for generating an image capable of being presented on the display 18 that presents the message information, and means for signaling the user via an audible or tactile alert that a message has been received. The display 18 is preferably comprised of a liquid crystal display (LCD) screen of one-eighth standard video graphics array (VGA) resolution. Software, stored in the non-volatile memory and executed by the microprocessor, produces a graphical user interface 20 (GUI) on the display 18. The operation of a selective call radio is well known to those skilled in the art; however, the operation of a selective call radio with a display is more fully described in U.S. patent application Ser. No. 08/461,610, now abandoned, entitled *Combination Information Display and Proximity Sensing Apparatus,* filed Jun. 5, 1995 by Rasor, in U.S. Pat. No. 5,182,553, entitled *Communication Receiver Providing Displayed Operating Instructions,* issued Jan. 26, 1993 to Kung, in U.S. Pat. No. 5,379,030, entitled *User Friendly Channel Selection in a Selective Call Receiver and Method Therefor,* issued Jan. 3, 1995 to Nolan, et al., and in U.S. Pat. No. 5,729,219 entitled *Selective Call Radio with Contraposed Touchpad,* issued Mar. 17, 1998 to Armstrong et al., all of which are assigned to the assignee of the present invention, and each of which are hereby fully incorporated by reference herein.

Figure 2:
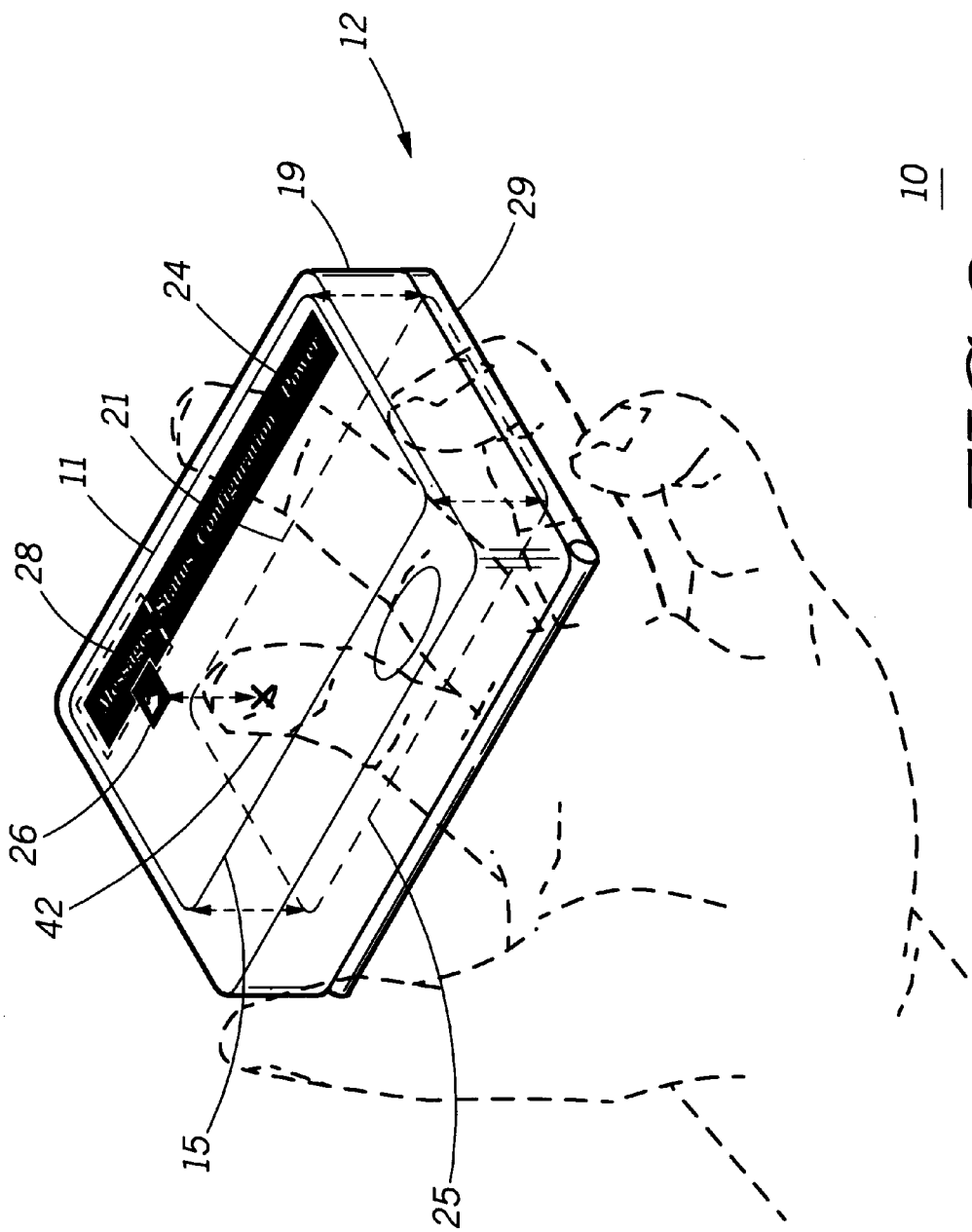
FIG. 2 is a perspective view of the selective call radio of FIG. 1 showing the touchpad housing member in a closed position.

FIG. 2 shows an exemplary menu title bar 24 with a pointer 26 positioned at the title "Messages" 28 on the left of the display. The selective call radio includes a button 54 on the display housing member 19 accessible to the user for use with the touchpad 22. The button 54 is used to activate the operation symbolized by a word or icon at which the pointer 26 is positioned. Alternatively, the button 54 also acts as an "on" switch, and the selective call radio 10 automatically turns itself off after a preselected period of inactivity.

The selective call radio 10 includes a switch 33 (FIG. 3). The switch 33, the touchpad 22, and the display 18 are electrically coupled to the controller (not shown). The controller produces a mapping of points on the touchpad, contacted with a stylus 63 (FIG. 1) or with a user's finger 42 (FIG. 2), with corresponding points on the display. When the touchpad housing member 29 is in the opened position shown in FIG. 1, the controller produces a conventional mapping. With conventional mapping, a bottom-to-top touching movement on the touchpad 22, i.e., from edge 21 to edge 25, produces to a bottom-to-top GUI pointer movement on the display 18, i.e., from edge 15 to edge 11. However, when the touchpad housing member 29 is in the closed position shown in FIG. 2, the controller produces a mirror-image mapping. With mirror-image mapping, movement on the touchpad 22 in the same direction as the bottom-to-top described above, i.e., from edge 21 to edge 25, produces to a top-to-bottom GUI pointer movement on the display 18, i.e., from edge 11 to edge 15. This advantageous change in the mapping of points on the touchpad 22 is accomplished preferably through the use of software executed by the microprocessor and initiated by actuation of the switch 33 (FIG. 3). Alternatively, the change in the mapping of points on the touchpad is accomplished through the use of a hardwire change in the coupling between the touchpad and the display, the change occurring as the position of the switch 33 changes.

FIG. 3 is a perspective view of an opposite side of the selective call radio housing 12 of FIG. 1 showing the touchpad housing member 29 in an intermediate position between the opened position shown in FIG. 1 and the closed position shown in FIG. 2. The display housing member 19 has a second surface 66 opposite the first surface 56. The touchpad housing member 29 has a second surface 68 opposite the first surface 58.

FIG. 4 is an enlarged view of a portion of the selective call radio shown in FIG. 3 showing details of area "A". Preferably, the switch 33 is mounted within the display housing member 19, with a plunger 64 extending through an opening 65 to a second surface 66 of the display housing member. In a variation of the preferred embodiment, the switch 33 is mounted to the second surface 66 of the display housing member 19. When the selective call radio housing 12 is in the closed position shown in FIG. 2, the plunger 64 is moved by the touchpad housing member, preferably by a bump 67 on the second surface 68 of the touchpad housing member 29, thereby actuating the switch. Alternatively, the switch 33 is mounted to the second surface 68 of the touchpad housing member 29, and the switch 33 is actuated by the second surface 66 of the display housing member 19 when the selective call radio housing 12 is in the closed position.

When the touchpad housing member 29 is rotated to the position shown in FIG. 1, both the display 18 and touchpad 22 are on the same side of the selective call radio 10, and both the display 18 and touchpad 22 are visible at the same time to a user. On the other hand, when the touchpad housing member 29 is rotated to the position shown in FIG. 2, the touchpad 22 becomes contraposed to the display 18, and the touchpad is not visible to a user at the same instant that the user is viewing the display. When using a contraposed touchpad 22 (FIG. 2), the component of coordinates along the transverse axis of the substantially rectangular touchpad is reversed with respect to the component of coordinates along the transverse axis of the substantially rectangular display. This contrasts with no reversal of coordinates when using the touchpad 22 on the same side of the selective call radio housing 12 as the display 18 (FIG. 1). As a result, a component of touching movement on the touchpad along its transverse axis, i.e., from edge 21 to edge 25, produces a component of movement of the pointer on the display along the display's corresponding axis, i.e., transverse axis, but in a reverse direction, i.e., from edge 11 to edge 15.

The controller selectively controls movement of the pointer 26 on the display 18 corresponding to touching movement on the touchpad 22 using one of a relative positioning system and an absolute positioning system. With an absolute positioning system, movement of a finger 42 or a stylus 63 in any direction of a given amount on the touchpad 22 produces movement of the pointer 26 on the display 18 a corresponding direction in the same given amount. With a relative positioning system, movement of a finger 42 or a stylus 63 in any direction of a given amount on the touchpad 22 produces movement of the pointer 26 on the display 18 a corresponding direction in a different amount. In the example of relative positioning shown in FIG. 1, the "h" on the display is smaller than the "h" on the touchpad; therefore, in this example, the different amount is a smaller amount. In accordance with the invention, the given amount can be a larger amount or a smaller amount. It should be noted that the "h" is visible on the touchpad 22 of FIG. 1 for purposes of illustration. Preferably, touching movement on the touchpad such as the "h" made by the stylus is not visible on the touchpad. Alternatively, a touchpad that allows such touching movement to be visible on the touchpad can be used. In accordance with the invention, the positioning system utilized is based upon the mechanical position of the touchpad housing member 29 relative to the display housing member 19.

Figure 5:
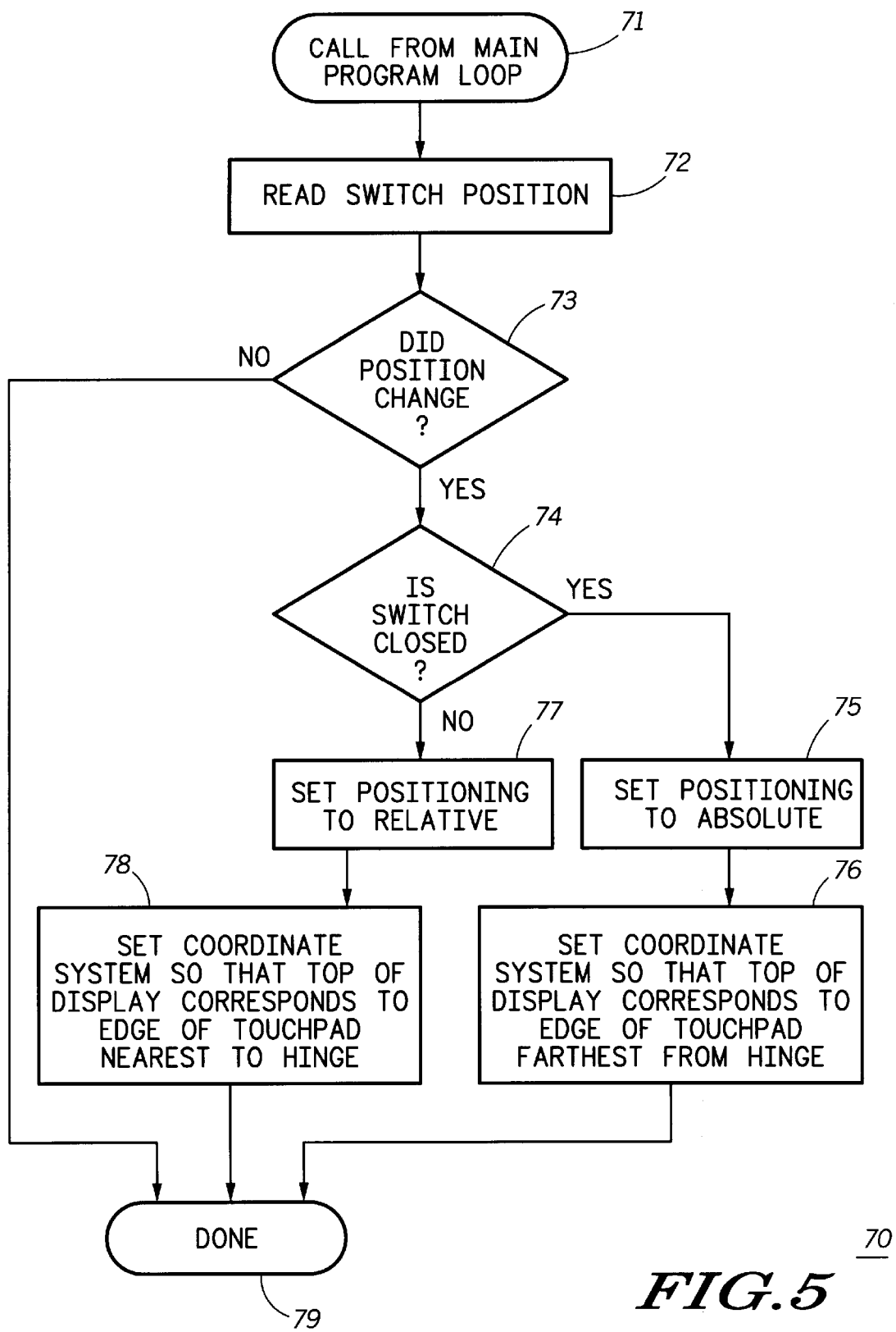
FIG. 5 is a flow diagram of the steps executed by a controller of the selective call radio in accordance with the invention.

FIG. 5 is a flow diagram of the steps executed by the controller of the selective call radio in accordance with the invention. The controller includes a microprocessor that is programmed by software stored in ROM to execute the steps of a subroutine shown in FIG. 5. At step 71, a call is made from the main program loop that controls the touchpad and display. At step 72, the position of the switch 33 is read at the occurrence of an interrupt, or the subroutine can be polled. At step 73, if the position of the switch has not changed since the previous interrupt, the subroutine is done (step 79), and the main program continues. If the position of the switch has changed since the previous interrupt, the subroutine continues to step 74. At step 74, if the switch is closed (indicating that the selective call radio housing is in the closed position and that the touchpad is contraposed to the display), then the subroutine goes to step 75. At step 75, the selective call radio's means for interconnecting the display with the touchpad is set to absolute positioning, and the subroutine goes to step 76. At step 76, a first coordinate system of the touchpad is selected so that the top, i.e., edge 11, of the display corresponds to the edge of the touchpad farthest from the hinge, i.e., edge 21, then the subroutine is finished at step 79. On the other hand, if, at step 74, the switch is open (indicating that the selective call radio housing is in the opened position and that the touchpad is on the same side of the selective call radio housing as the display), then the subroutine goes to step 77. At step 77, the selective call radio's means for interconnecting the display with the touchpad is set to relative positioning, and the subroutine goes to step 78. At step 78, a second coordinate system of the touchpad is selected so that the top, i.e., edge 11, of the display corresponds to the edge of the touchpad nearest the hinge, i.e., edge 25, then the subroutine is finished at step 79. Preferably, the selective call radio in accordance with the invention uses the relative positioning system when the selective call radio housing 12 is in the opened position and uses the absolute positioning system when the selective call radio housing 12 is in the closed position; however, the converse is also contemplated. Preferably, the selective call radio uses the relative positioning system when the coordinate system on the touchpad is the same as the coordinate system on the display, and the selective call radio uses the absolute positioning system when the coordinate system on the touchpad is a different coordinate system as the coordinate system on the display; however, any mixing of coordinate systems and positioning systems on the display and touchpad is also contemplated.

Referring again to FIGS. 1 and 2, the user navigates within the GUI, including selectively viewing messages on the display 18, through the use of the touchpad 22. The operation of a touchpad 22 to control a pointer on a GUI is well known, and a description of the operation of a touchpad is described in U.S. Pat. No. 4,129,747, entitled *Human-Machine Interface Apparatus,* issued Dec. 12, 1978 to Pepper, and in U.S. Pat. No. 4,302,011, entitled *Video Game Apparatus and Method,* issued Nov. 24, 1981 to Pepper, which are hereby fully incorporated by reference herein.

In summary, there has been described a selective call radio housing 12 that is comprised of two members connected by a hinge 31. Further, there has been described a selective call radio housing 12 with a touchpad 22 that advantageously functions both in the manner of a touchpad for a portable computer and also in the manner of a touchpad for a selective call radio with a contraposed touchpad, depending upon the position of the hinged touchpad. There has also been described a selective call radio 10 that has a controller programmed to automatically change the mapping of points on the touchpad 22 depending upon actuation of a switch 33, and in which the switch is actuated by the position of the hinged touchpad without any extra actions of the part of the user. Advantageously, the controller simultaneously changes the coordinate system of the touchpad 22 while also selecting either a relative positioning system or an absolute positioning system, depending upon whether the selective call radio housing 12 is opened or closed.

While a detailed description of the preferred embodiment of the invention has been given, it should be appreciated this invention can be realized in a number of embodiments, of which the disclosed embodiment is only one alternative, without departing from the scope of the invention as set forth in the appended claims. For example, the touchpad 22 can have only one coordinate system, while the display 18 can have two coordinate systems. Further, selective call radio 10 is not limited to only one relative positioning system. Although, the preferred embodiment shows the display 18 and the touchpad 22 substantially contraposed when the selective call radio housing 12 is in the closed position, the display and touchpad need not be substantially contraposed, but merely be on opposite external sides of the closed selective call radio housing. Also, although the preferred embodiment shows the hinge parallel to the longitudinal axes of the display 18 and the touchpad 22, the hinge is alternatively parallel to the transverse axes, in which case the mirror-image mapping occurs along the longitudinal axes of the display and touchpad.

I claim:

1. A selective call radio, comprising:
   a selective call radio housing having a display housing member and a touchpad housing member hingely connected to the display housing member;
   a display for displaying a pointer of a graphical user interface, the display fixed to the display housing member, the display having a first coordinate system;
   a touchpad fixed to the touchpad housing member, the touchpad having one of a first coordinate system and a second coordinate system; and
   a controller, electronically coupled to the display and to the touchpad, for selectively controlling movement of the pointer on the display corresponding to touching movement on the touchpad using one of the first coordinate system and the second coordinate system, the coordinate system used being based upon a mechanical position of the touchpad housing member relative to the display housing member.

2. The selective call radio of claim 1 in which the controller selectively controls movement of the pointer on the display such that, using the first coordinate system, a component of touching movement on the touchpad along an axis of the touchpad produces a component of movement of the pointer on the display along a corresponding axis of the display in a same direction, and, such that, using the second coordinate system, a component of touching movement on the touchpad along an axis of the touchpad produces a component of movement of the pointer on the display along the corresponding axis of the display in a reverse direction.

3. The selective call radio of claim 2 in which the controller selectively controlling movement of the pointer on the display corresponding to touching movement on the touchpad using one of a relative positioning system and an absolute positioning system, the positioning system based upon mechanical position of the touchpad housing member relative to the display housing member.

4. The selective call radio of claim 1 in which the controller selectively controlling movement of the pointer on the display corresponding to touching movement on the touchpad using one of a relative positioning system and an absolute positioning system, the positioning system based upon mechanical position of the touchpad housing member relative to the display housing member.

5. The selective call radio of claim 4 in which the controller selectively controls movement of the pointer on the display such that, using the first coordinate system, a component of touching movement on the touchpad along an axis of the touchpad produces a component of movement of the pointer on the display along a corresponding axis of the display in a same direction, and, such that, using the second coordinate system, a component of touching movement on the touchpad along an axis of the touchpad produces a component of movement of the pointer on the display along the corresponding axis of the display in a reverse direction.

6. The selective call radio of claim 1, including a switch electrically coupled to the controller and mounted to a surface of the display housing member such that the switch is actuated by the touchpad housing member depending upon the mechanical position of the touchpad housing member relative to the display housing member.

7. The selective call radio of claim 6 in which the controller selectively controls movement of the pointer in response to actuation of the switch.

8. The selective call radio of claim 6, in which the selective call radio housing has a closed position and an opened position, and the switch is actuated by the touchpad housing member when the selective call radio housing is in the closed position.

9. The selective call radio of claim 8 in which the controller selectively controls movement of the pointer in response to actuation of the switch.

10. The selective call radio of claim 1, including a switch electrically coupled to the controller and mounted to a surface of the touchpad housing member such that the switch is actuated by the display housing member depending upon the mechanical position of the touchpad housing member relative to the display housing member.

11. The selective call radio of claim 10 in which the controller selectively controls movement of the pointer in response to actuation of the switch.

12. The selective call radio of claim 10, in which the selective call radio housing has a closed position and an opened position, and the switch is actuated by the display housing member when the selective call radio housing is in the closed position.

13. The selective call radio of claim 12 in which the controller selectively controls movement of the pointer in response to actuation of the switch.

14. A selective call radio housing, comprising:
   a display housing member having a display mounted to a surface thereof; and
   a touchpad housing member having a touchpad mounted to a surface thereof, the touchpad housing member hingely connected to the display housing member, the touchpad housing member being movable from an opened position to a closed position relative to the display housing member such that the touchpad and the display are on opposite external sides of the selective call radio housing when the touchpad housing member is in the closed position and such that the touchpad and the display are on a same side of the selective call radio housing when the touchpad housing member is in the opened position.

15. The selective call radio housing of claim 14 such that the touchpad is contraposed to the display when the touchpad housing member is in the closed position.

16. The selective call radio housing of claim 14, including a switch, in which the display housing member has a first surface and a second surface, the second surface being opposite the first surface, and in which the display is mounted to the first surface of the display housing member and in which the switch is mounted to the second surface of the display housing member such that the switch is actuated when the touchpad housing member is in the closed position.

17. The selective call radio housing of claim 16 in which the touchpad housing member has a first surface and a second surface, the second surface being opposite the first surface, and in which the touchpad is mounted to the first surface of the touchpad housing member and in which the switch is actuated by the second surface of the touchpad housing member.

18. The selective call radio housing of claim 17 such that the touchpad is contraposed to the display when the touchpad housing member is in the closed position.

19. The selective call radio housing of claim 14, including a switch, in which the touchpad housing member has a first surface and a second surface, the second surface being opposite the first surface, and in which the touchpad is mounted to the first surface of the touchpad housing member and in which the switch is mounted to the second surface of the touchpad housing member such that the switch is actuated when the display housing member is in the closed position.

20. The selective call radio housing of claim 19 in which the display housing member has a first surface and a second surface, the second surface being opposite the first surface, and in which the display is mounted to the first surface of the display housing member and in which the switch is actuated by the second surface of the display housing member.

21. The selective call radio housing of claim 20 such that the touchpad is contraposed to the display when the touchpad housing member is in the closed position.

* * * * *